United States Patent
Akiyama

(10) Patent No.: US 7,443,574 B2
(45) Date of Patent: Oct. 28, 2008

(54) OPTICAL TRANSMISSION SYSTEM

(75) Inventor: Tomoyuki Akiyama, Kawasaki (JP)

(73) Assignee: Fijitsu Limited, Kawasaki (JP)

( * ) Notice: Subject to any disclaimer, the term of this patent is extended or adjusted under 35 U.S.C. 154(b) by 0 days.

(21) Appl. No.: 11/542,227

(22) Filed: Oct. 4, 2006

(65) Prior Publication Data
US 2007/0230967 A1    Oct. 4, 2007

(30) Foreign Application Priority Data
Mar. 31, 2006   (JP) ............................... 2006-098288

(51) Int. Cl.
  *H04B 10/17*    (2006.01)
(52) U.S. Cl. ..................... 359/333; 398/175
(58) Field of Classification Search ................ 359/333, 359/337.1, 3; 398/175
See application file for complete search history.

(56) References Cited

U.S. PATENT DOCUMENTS

| | | | |
|---|---|---|---|
| 6,717,718 B1 | 4/2004 | Kelsoe et al. | 359/333 |
| 6,859,307 B2* | 2/2005 | Takeda et al. | 359/337 |
| 7,027,741 B2* | 4/2006 | Marutani et al. | 398/173 |
| 7,072,589 B2* | 7/2006 | Joergensen | 398/175 |
| 7,076,174 B2* | 7/2006 | Watanabe et al. | 398/158 |
| 2002/0041618 A1* | 4/2002 | Watanabe et al. | 372/76 |
| 2003/0156776 A1 | 8/2003 | Han et al. | 385/11 |
| 2004/0052534 A1* | 3/2004 | Joergensen | 398/177 |
| 2007/0104491 A1* | 5/2007 | Hainberger et al. | 398/175 |

FOREIGN PATENT DOCUMENTS

| | | |
|---|---|---|
| EP | 1 582 915 A2 | 10/2005 |
| JP | 2001-222037 | 8/2001 |
| JP | 2002-44020 | 2/2002 |
| JP | 3459213 | 10/2003 |
| JP | 2004-173026 | 6/2004 |

OTHER PUBLICATIONS

European Search Report dated Dec. 28, 2007.

* cited by examiner

*Primary Examiner*—Eric Bolda
(74) *Attorney, Agent, or Firm*—Kratz, Quintos & Hanson, LLP

(57) ABSTRACT

An optical transmission system includes an optical nonlinear element having nonlinear input/output characteristics, a power detector detecting a power of a specific frequency component related to an optical signal reproduced by the optical nonlinear element, and a variable amplifier amplifying or attenuating the optical signal inputted to the optical nonlinear element. Evaluation of an output waveform is performed based on the power of the specific frequency component detected by the power detector, and a gain of the variable amplifier is properly controlled, so that an input power of the optical signal inputted to the optical nonlinear element can be easily set such that a good output waveform can be obtained without directly measuring the inputted or outputted optical signal.

9 Claims, 6 Drawing Sheets

F I G. 1
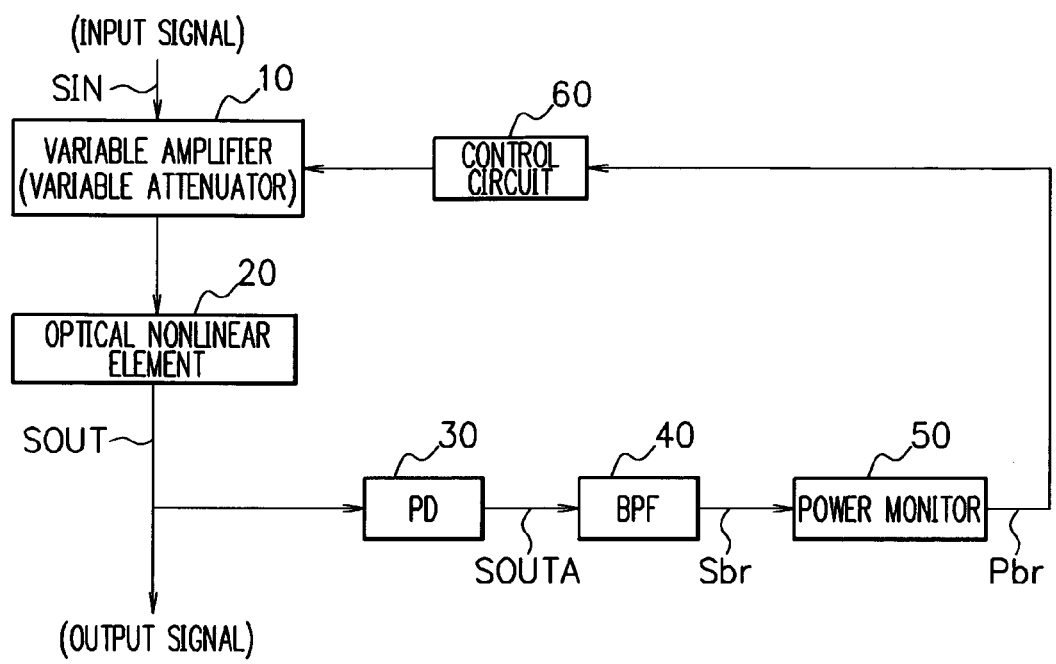
F I G. 2
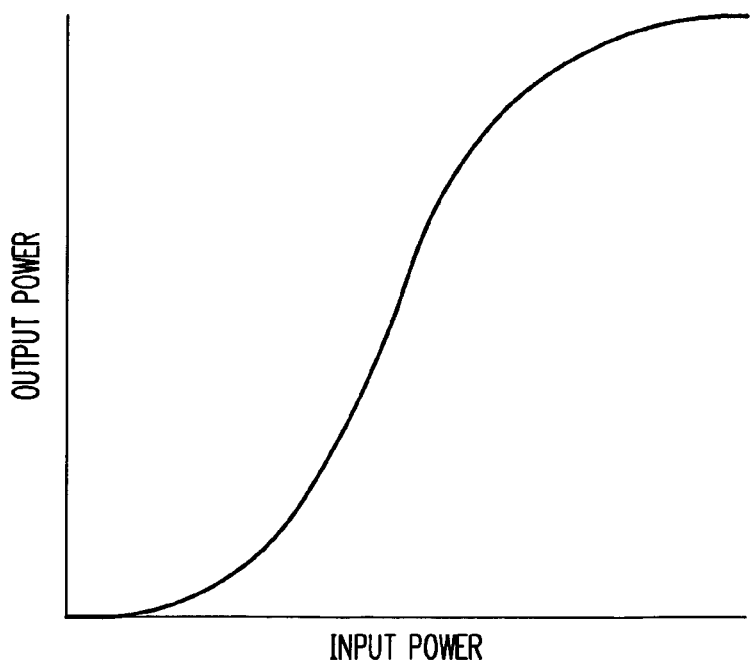

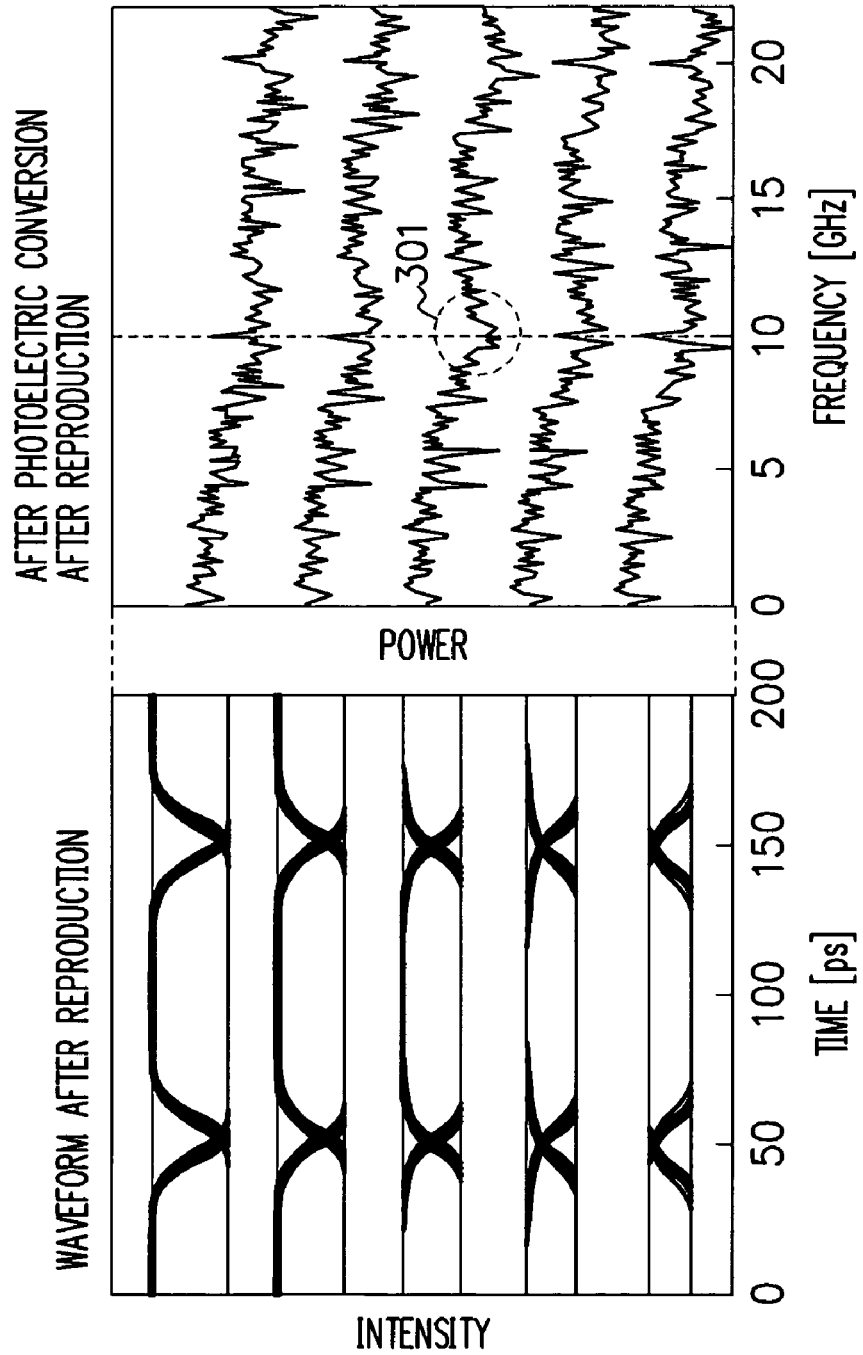

OPTICAL TRANSMISSION SYSTEM

CROSS-REFERENCE TO RELATED APPLICATIONS

This application is based upon and claims the benefit of priority from the prior Japanese Patent Application No. 2006-098288, filed on Mar. 31, 2006, the entire contents of which are incorporated herein by reference.

BACKGROUND OF THE INVENTION

1. Field of the Invention

The present invention relates to an optical transmission system, and, in particular, is preferably used in a reproduction interconnection device in optical communication.

2. Description of the Related Art

In optical communication, a reproduction interconnection device is used in order to suppress deterioration of an optical signal due to a noise of an amplifier or waveform distortion during transmission. When an optical nonlinear element which has nonlinear input/output characteristics as shown in FIG. 7 is used for the reproduction interconnection device, fluctuation (noise) of level "0" and level "1" of the optical signal due to waveform deterioration associated with transmission can be compressed. As for such an optical nonlinear element in which a relation of an input power and an output power is nonlinear, numerous documents are disclosed, such as Patent Document 1 and Patent Document 2, for example.

In a case that waveform-shaping of the optical signal is performed using the optical nonlinear element, if an input signal is the one having a specific input power (for example, an input power IP2) on an input/output curve of the optical nonlinear element as shown in FIG. 8, reproduction is properly performed and an output signal WVO2 with a good waveform can be obtained. However, if the power of the input signal deviates from the specific input power, reproduction may not be properly performed and the waveform may not be improved.

As shown in FIG. 8, if the power of the input signal is too low (for example, an input power IP1), the noise of level "0" in the optical signal is compressed by the optical nonlinear element, but the noise of level "1" is emphasized (see an output signal WVO1). On the other hand, if the power of the input signal is too high (for example, an input power IP3), the noise of level "1" in the optical signal is compressed by the optical nonlinear element, but the noise of level "0" is emphasized (see an output signal WVO3).

In the reproduction interconnection device in which the optical nonlinear element is used, a condition (input power to the optical nonlinear element) enabling to obtain an output signal of a good waveform is determined in response to the input signal and the input/output characteristics of the optical nonlinear element. When the condition is to be determined, it is necessary to recognize a cross point in an eye pattern of the input signal or the output signal. Here, in Patent Document 3, Patent Document 4 and the like, evaluation methods of optical signals are proposed.

[Patent Document 1] Japanese Patent Application Laid-open No. 2001-222037

[Patent Document 2] Japanese Patent Application Laid-open No. 2002-44020

[Patent Document 3] Japanese Patent Application Laid-open No. 2004-173026

[Patent Document 4] Japanese Patent No. 3459213

However, it is not easy to directly measure the cross point in the input signal or the output signal to determine the input power to the optical nonlinear element. Additionally, kinds of the input signal inputted to the optical nonlinear element vary. Therefore, it is difficult to respond to various input signals by a method in which the cross point is directly measured to control the input power to the optical nonlinear element to be a specific value enabling to obtain a good output waveform.

SUMMARY OF THE INVENTION

An object of the present invention is to make it possible that an input power to an optical nonlinear element is easily set at a value enabling to obtain a good output waveform, for any inputted optical signal.

An optical transmission system of the present invention includes an optical nonlinear element having nonlinear input/output characteristics, a power detector detecting a power of a specific frequency component related to the optical signal reproduced by the optical nonlinear element, and a variable amplifier amplifying or attenuating the optical signal inputted to the optical nonlinear element, and a gain of the variable amplifier is controlled in response to a detection result by the power detector.

According to the present invention, evaluation of an output signal waveform is performed by detecting a power of a specific frequency component from an electrical signal obtained by converting an optical signal reproduced by an optical nonlinear element. By making a gain of a variable amplifier increase or decrease properly based on a result thereof, an input power of an optical signal inputted to the optical nonlinear element is controlled, and thereby, the input power to the optical nonlinear element can be easily set such that a good output waveform can be obtained.

BRIEF DESCRIPTION OF THE DRAWINGS

FIG. 1 is a diagram showing a constitutional example of a reproduction interconnection device in a first embodiment of the present invention;

FIG. 2 is a graph showing input/output characteristics of an optical nonlinear element;

FIG. 3 is a view showing an output waveform of the optical nonlinear element and an electrical spectrum after photoelectric conversion;

DETAILED DESCRIPTION OF THE PREFERRED EMBODIMENTS

Figure 4A:
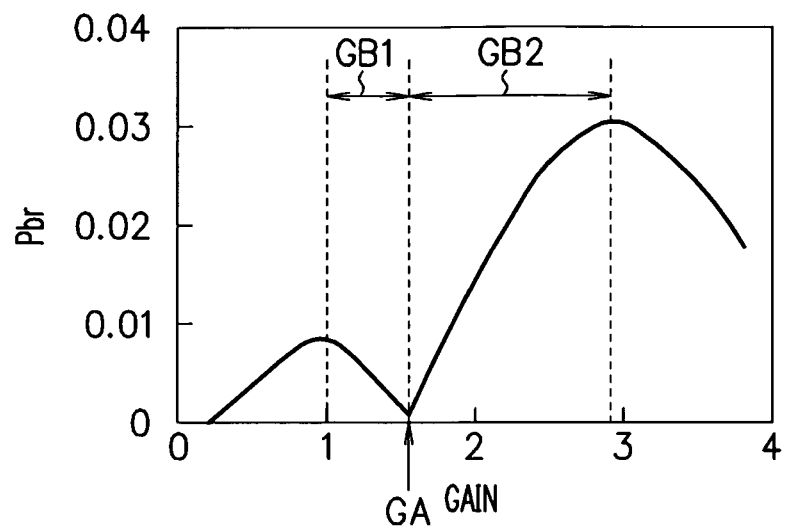
FIG. 4A is a graph showing a relation between a gain of a variable amplifier and a power of a bit rate frequency component in the first embodiment.

Hereinafter, embodiments of the present invention will be described based on the drawings.

First Embodiment

FIG. 1 is a block diagram showing a constitutional example of a reproduction interconnection device to which an optical transmission system according to a first embodiment of the present invention is applied. The reproduction interconnection device in the first embodiment shown in FIG. 1 is a reproduction interconnection device responding to an optical signal of a modulation format in which a signal level does not transit during a period equivalent to one bit, for example an NRZ (Non Return to Zero) format.

The reproduction interconnection device in the first embodiment has, as shown in FIG. 1, a variable amplifier (variable attenuator) 10, an optical nonlinear element 20, a photo detector (PD) 30, a band pass filter (BPF) 40, a power monitor 50, and a control circuit 60. The reproduction interconnection device in the first embodiment, to which an optical signal SIN is inputted as an input signal, performs reproduction thereof to output a waveform-shaped optical signal SOUT as an output signal.

The variable amplifier (variable attenuator) 10 amplifies or attenuates the inputted optical signal SIN and outputs to the optical nonlinear element 20. In other words, the variable amplifier (variable attenuator) 10 controls a power of the optical signal inputted to the optical nonlinear element 20 (input power to the optical nonlinear element 20). A gain of the variable amplifier (variable attenuator) 10 is controlled by the control circuit 60.

The optical nonlinear element 20 is an element having nonlinear input/output characteristics as shown in FIG. 2. The optical nonlinear element 20 waveform-shapes the optical signal from the variable amplifier (variable attenuator) 10 and outputs the optical signal SOUT. FIG. 2 is a graph showing the input/output characteristics of the optical nonlinear element 20, a horizontal axis denoting an input power and a vertical axis denoting an output power. In the optical nonlinear element 20, a relation between the input power and the output power is nonlinear, the output power varying nonlinearly in relation to the input power. By the optical nonlinear element 20 having such a nonlinear input/output characteristics, fluctuation (noise) of level "0" and level "1" in the optical signal can be compressed.

The photo detector 30 is to perform photoelectric conversion and converts the optical signal SOUT after waveform-shaping (reproduction) which is outputted from the optical nonlinear element 20 to an electrical signal SOUTA. The band pass filter 40 retrieves a bit rate frequency component Sbr equivalent to a bit rate of the input signal, from the electrical signal SOUTA obtained by conversion in the photo detector 30. To put it differently, the band pass filter 40 passes only the bit rate frequency component Sbr in the electrical signal from the photo detector 30. The power monitor 50 measures a power Pbr of the bit rate frequency component Sbr retrieved by the band pass filter 40, in other words, a power of the signal having passed through the band pass filter 40.

The photo detector 30, the band pass filter 40, and the power monitor 50 comprise a power detector of the present invention. By this power detector, it is possible to measure the bit rate frequency component power Pbr in the electrical signal obtained by photoelectrically converting the optical signal SOUT outputted from the optical nonlinear element 20.

The control circuit 60 performs gain control of the variable amplifier (variable attenuator) 10 based on the bit rate frequency component power Pbr detected by the photo detector 30, the band pass filter 40, and the power monitor 50.

Here, the bit rate frequency component power Pbr has a disposition of varying in response to a cross point position in the outputted optical signal SOUT. As shown in an example in FIG. 3, the bit rate frequency component power Pbr becomes minimum, when the cross point is at a position of 50%.

FIG. 3 is a view showing an output waveform of the optical nonlinear element (waveform after reproduction) and an electrical spectrum after photoelectric conversion. As is obvious from FIG. 3, in the electrical spectrum obtained by photoelectrically converting the waveform after reproduction, among frequency components responding to 10 GHz being the bit rate (carrier frequency), a frequency component of the waveform after reproduction with a cross point of an eye pattern at the position of 50% is minimum (see 301 in FIG. 3), and the frequency components are larger than it in other waveforms after reproduction.

Therefore, presuming that the output waveform is optimum when the cross point of the outputted optical signal SOUT is at the position of 50%, a good output waveform can be obtained if the gain of the variable amplifier (variable attenuator) 10 is controlled such that the bit rate frequency component power Pbr obtained based on the outputted optical signal SOUT becomes minimum.

Additionally, the gain of the variable amplifier (variable attenuator) 10 and the power Pbr of the bit rate frequency component have a relation shown in FIG. 4A. In FIG. 4A, a horizontal axis denotes the gain of the variable amplifier (variable attenuator) 10, a vertical axis denotes the power Pbr of the bit rate frequency component, and a gain GA denotes a gain value with which the power Pbr of the bit rate frequency component becomes minimum.

The control circuit 60 in the present embodiment controls such that the power Pbr of the bit rate frequency component becomes minimum, in other words, such that the gain of the variable amplifier (variable attenuator) 10 is the optimum gain GA. This control is performed according to a control algorithm as below.

Figure 4B:
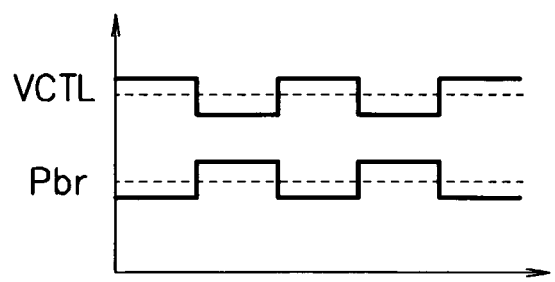
FIG. 4B and FIG. 4C are views for describing a control principle in the first embodiment.
Figure 4C:
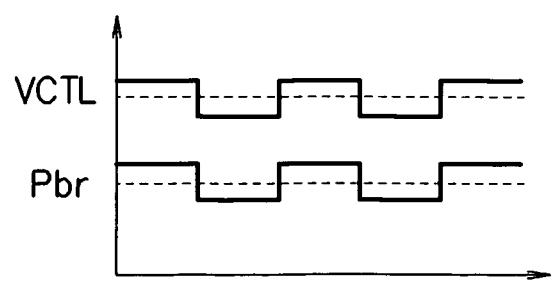

The control circuit 60, which generates a control voltage for controlling the gain of the variable amplifier (variable attenuator) 10, superimposes a signal of small amplitude to this control voltage as shown in FIG. 4B and FIG. 4C, and outputs to the variable amplifier (variable attenuator) 10. In other words, the control circuit 60 makes the gain of the variable amplifier (variable attenuator) 10 vary periodically in a minute range centering on a certain gain (defined target gain). Incidentally, in FIG. 4B and FIG. 4C, signals VCTL are voltages supplied from the control circuit 60 to the variable amplifier (variable attenuator) 10, and broken lines in the views denote defined target gains.

Then, the control circuit 60 obtains the bit rate frequency component power Pbr according to the optical signal SOUT obtained by making the gain of the variable amplifier (variable attenuator) 10 vary periodically and minutely by superimposing the signal of small amplitude to the control voltage, and compares variation of the bit rate frequency component power Pbr and variation of the signal VCTL.

As a result, in a case that the signal VCTL and the bit rate frequency component power Pbr vary in a relation of reverse-phase as shown in FIG. 4B, in other words, in a case that the bit rate frequency component power Pbr decreases when the gain of the variable amplifier (variable attenuator) 10 increases, the control circuit 60 judges that the gain of the variable amplifier (variable attenuator) 10 is in a range GB1 shown in FIG. 4A. Therefore, the control circuit 60 judges that the gain of the variable amplifier (variable attenuator) 10 is smaller than the optimum gain GA, and makes the control voltage to be supplied to the variable amplifier (variable attenuator) 10 vary to increase the gain.

On the other hand, in a case that the signal VCTL and the bit rate frequency component power Pbr vary in a relation of in-phase as shown in FIG. 4C, in other words, in a case that the bit rate frequency component power Pbr increases when the gain of the variable amplifier (variable attenuator) 10 increases, the control circuit 60 judges that the gain of the variable amplifier (variable attenuator) 10 is in a range GB2 shown in FIG. 4A. Therefore, the control circuit 60 judges that the gain of the variable amplifier (variable attenuator) 10 is larger than the optimum gain GA, and makes the control voltage to be supplied to the variable amplifier (variable attenuator) 10 vary to reduce the gain.

By repeating the above operations, the control circuit 60 can converge the gain of the variable amplifier (variable attenuator) 10 to the optimum gain GA and maintain it.

According to the first embodiment, from the electrical signal SOUTA obtained by photoelectrically converting, by the photo detector 30, the optical signal SOUT after reproduction which is outputted from the optical nonlinear element 20, the bit rate frequency component power Pbr is detected by the band pass filter 40 and the power monitor 50. In response to this detection result, the control circuit 60 performs gain control of the variable amplifier (variable attenuator) 10, specifically such that the detected bit rate frequency component power Pbr becomes minimum, and then the input power to the optical nonlinear element is controlled.

Hereby, not by directly measuring the cross point of the inputted or outputted optical signal but by performing waveform evaluation of the outputted optical signal SOUT by an easy method to properly control the gain of the variable amplifier (variable attenuator) 10, the input power to the optical nonlinear element 20 can be easily set such that a good output waveform can be obtained. Therefore, it is possible to provide a reproduction interconnection device which is small and capable of performing good waveform-shaping for any inputted optical signal by a method which can be easily reduced in cost.

Second Embodiment

Next, a second embodiment of the present invention will be described.

Figure 5:
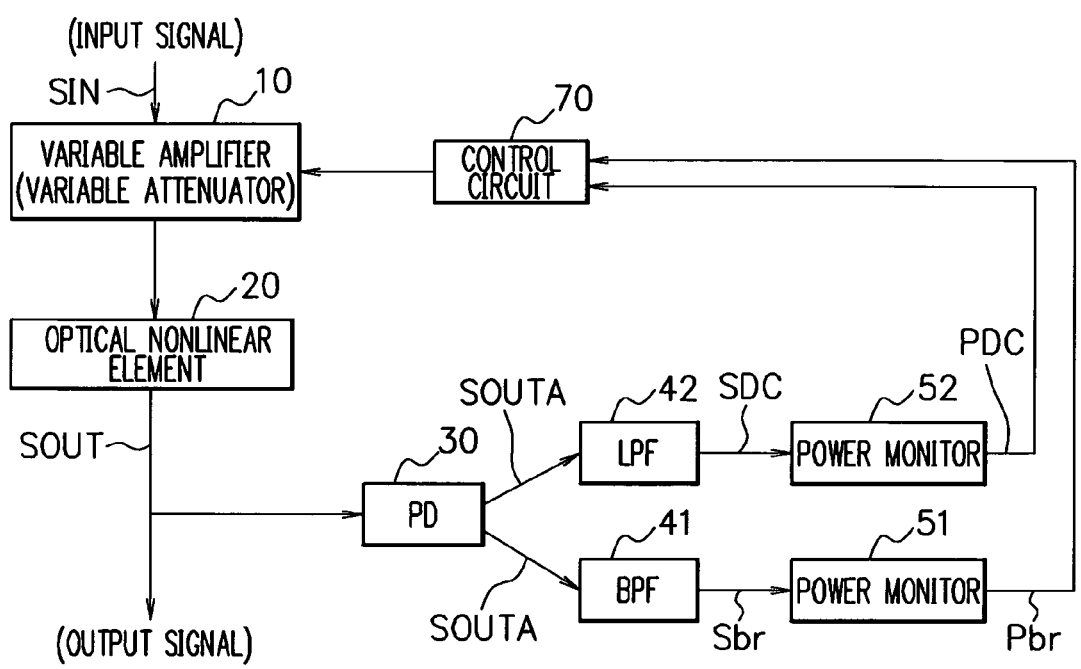
FIG. 5 is a diagram showing a constitutional example of a reproduction interconnection device in a second embodiment of the present invention.

FIG. 5 is a block diagram showing a constitutional example of a reproduction interconnection device to which an optical transmission system according to the second embodiment of the present invention is applied. In this FIG. 5, the same numerals and symbols are given to the blocks and the like having the same functions as the blocks and the like shown in FIG. 1, and the overlapping explanation will be omitted. The reproduction interconnection device in the second embodiment shown in FIG. 5 is a reproduction interconnection device responding to an optical signal of RZ (Return to Zero) format.

The reproduction interconnecting device in the second embodiment has, as shown in FIG. 5, a variable amplifier (variable attenuator) 10, an optical nonlinear element 20, a photo detector (PD) 30, a band pass filter (BPF) 41, a low pass filter (LPF) 42, power monitors 51, 52, and a control circuit 70. The reproduction interconnection device in the second embodiment, to which an optical signal SIN is inputted as an input signal, performs reproduction thereof to output a waveform-shaped optical signal SOUT as an output signal.

The band pass filter 41 and the power monitor 51 correspond to the band pass filter 40 and the power monitor 50 respectively.

The low pass filter 42 retrieves a direct current (DC) component SDC from an electrical signal SOUTA obtained by conversion in the photo detector 30. To put it differently, the low pass filter 42 passes only the direct current component SDC in the electrical signal from the photo detector 30. The power monitor 52 measures a power PDC of the direct current component SDC retrieved by the low pass filter 42, in other words, a power of the signal having passed through the low pass filter 42.

The photo detector 30, the band pass filter 41, the low pass filter 42, and the power monitors 51, 52 constitute a power detector of the present invention. By a series made of the photo detector 30, the band pass filter 41, and the power monitor 51, a bit rate frequency component power Pbr related to an output signal from the optical nonlinear element 20 can be measured, while by a series made of the photo detector 30, the low pass filter 42, and the power monitor 52, the direct current component power PDC related to an output signal from the optical nonlinear element 20 can be measured.

The control circuit 70 performs gain control of the variable amplifier (variable attenuator) 10 based on the bit rate frequency component power Pbr and the direct current component power PDC detected by the photo detector 30, the band pass filter 41, the low pass filter 42, and the power monitors 51, 52 as described above.

Here, the reproduction interconnection device in the second embodiment is the one to respond to an optical signal of the RZ format, and so the method of controlling the position of the cross point as in the first embodiment cannot be applied thereto.

Figure 6A:
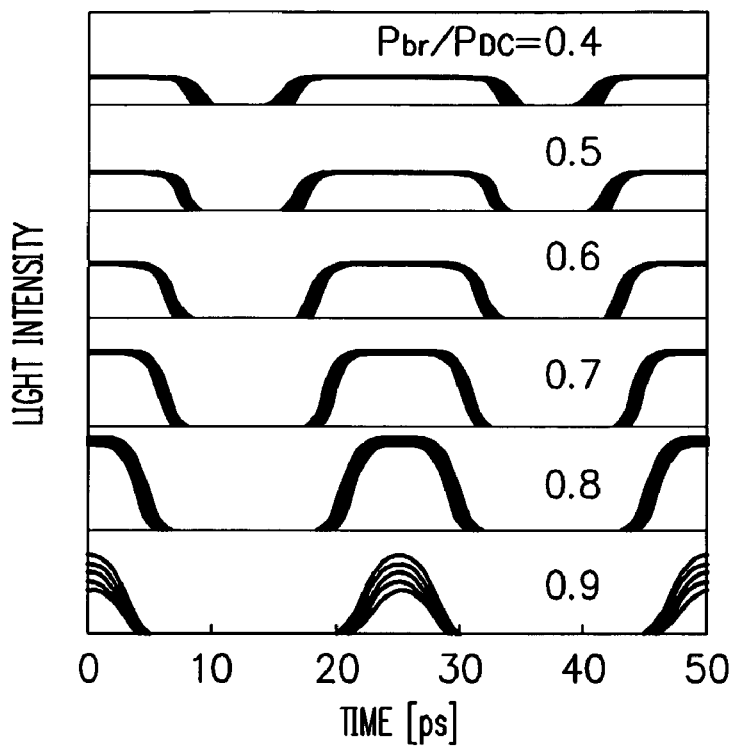
FIG. 6A is a view showing an output waveform corresponding to a power ratio in the second embodiment.

In the second embodiment, an optimum input power to the optical nonlinear element 20 is considered to be a power with which a duty ratio of the outputted optical signal SOUT becomes a desirable value. As shown in FIG. 6A, the duty ratio of the outputted optical signal SOUT varies in response to a ratio of the bit rate frequency component power Pbr to the direct current component power PDC (Pbr/PDC).

The control circuit 70 in the second embodiment judges whether or not the duty ratio of the outputted optical signal SOUT is the desired value by calculating the ratio of the bit rate frequency component power Pbr to the direct current component power PDC measured by the power monitors 51, 52 (Pbr/PDC). Hereby, the control circuit 70 performs waveform evaluation of the outputted optical signal SOUT and performs gain control of the variable amplifier (variable attenuator) 10.

Figure 6B:
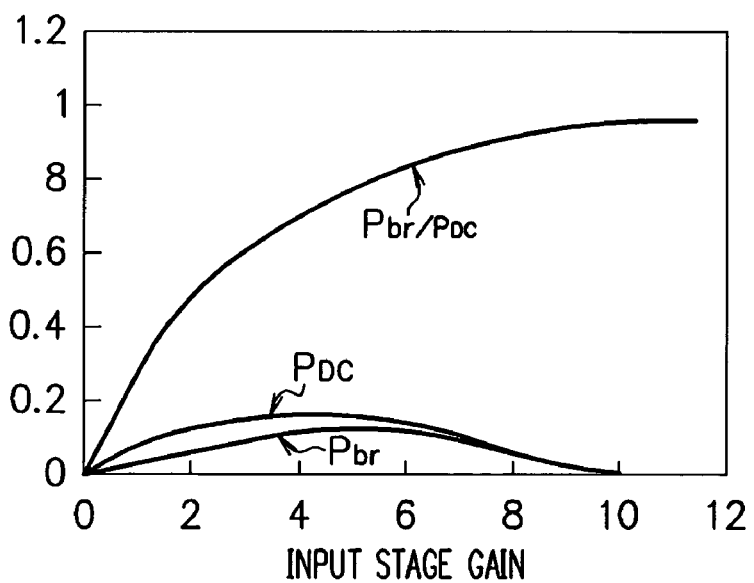
FIG. 6B is a graph showing a relation between a gain of a variable amplifier, a power of each frequency component, and a rate thereof in the second embodiment.
Figure 7:
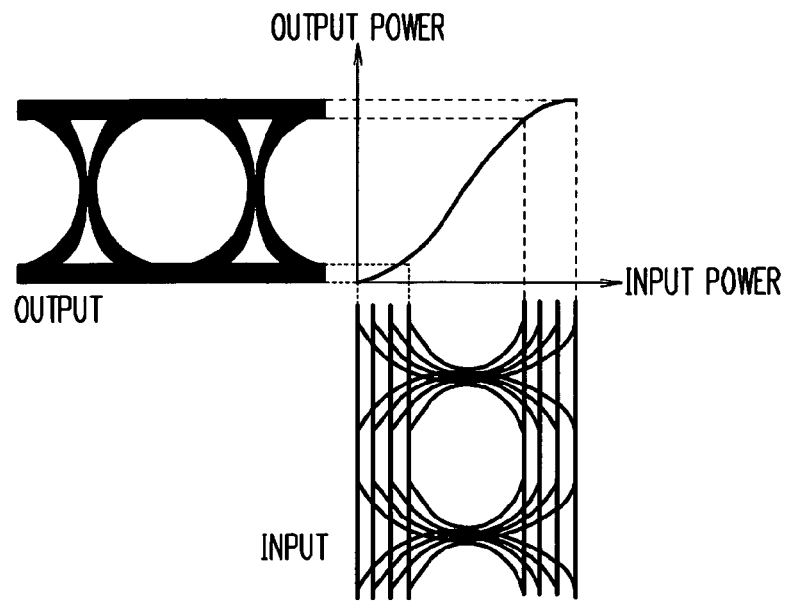
FIG. 7 is a view for describing waveform-shaping using an optical nonlinear element.
Figure 8:
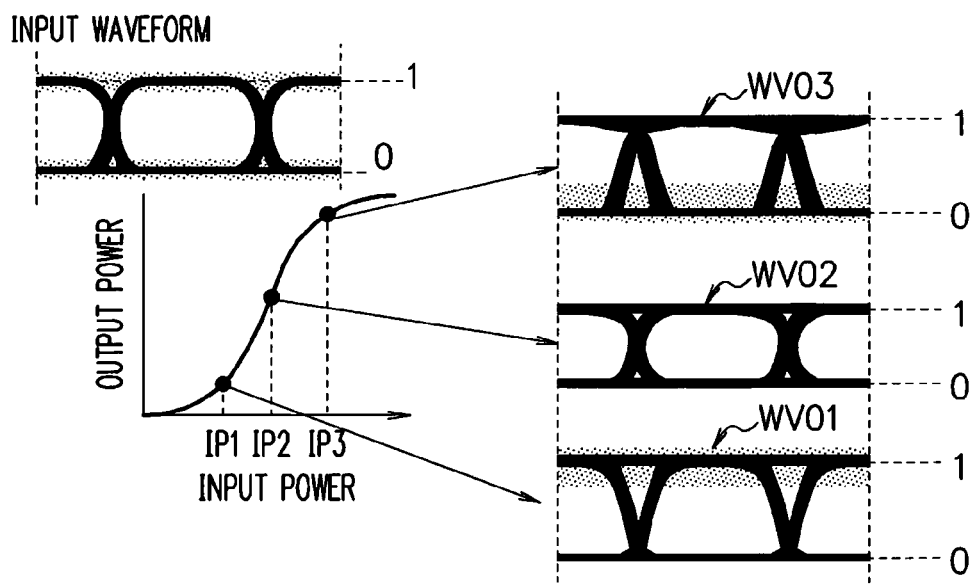
FIG. 8 is a view showing a relation between a power of an input signal and an output waveform in an optical nonlinear element.

More specifically, as shown in FIG. 6B, the power ratio (Pbr/PDC) corresponding to the duty ratio is a monotone increasing function of the gain of the variable amplifier (variable attenuator) 10. Then, the control circuit 70 calculates the ratio of the bit rate frequency component power Pbr to the direct current component power measured by the power monitors 51, 52 (Pbr/BDC), and compares it with a value of the power ratio for obtaining the desired duty ratio.

In response to the comparative result, the control circuit 70 performs gain control of the variable amplifier (variable attenuator) 10 such that the power ratio becomes the one enabling the desired duty ratio. Then, the control circuit 70 controls such that the ratio of the measured bit rate frequency component power Pbr to the direct current component power PDC (Pbr/PDC) maintains a desired constant value.

According to the second embodiment, the bit rate frequency component power Pbr and the direct component power DPC are detected from the electrical signal SOUTA obtained by photoelectrically converting the optical signal SOUT after reproduction which is outputted from the optical nonlinear element 20. Then, in response to this detection result, more specifically, such that the power ratio (Pbr/PDC) calculated based on the detection result is maintained at the desired constant value, the control circuit 70 performs gain control of the variable amplifier (variable attenuator) 10, and the input power to the optical nonlinear element 20 is controlled.

Hereby, instead of directly measuring the inputted or outputted optical signal, waveform evaluation of the outputted optical signal SOUT is performed by the easy method, and the input power to the optical nonlinear element 20 can be easily set such that a good output waveform can be obtained. Therefore, it is possible to provide a reproduction interconnection device which is small and capable of performing good waveform-shaping for any inputted optical signal by a method which can be easily reduced in cost.

According to the present invention, evaluation of an output signal waveform is performed by detecting a power of a specific frequency component from an electrical signal obtained by converting an optical signal reproduced in an optical nonlinear element, and based on a result thereof, a gain of a variable amplifier is controlled. Hereby, an input power of the optical signal inputted to the optical nonlinear element can be easily set such that a good output waveform can be obtained, in response to the evaluation result of the output signal waveform. Therefore, it is possible to provide an optical transmission system which is small and capable of performing good signal reproduction for any inputted optical signal by a method which can be easily reduced in cost.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An optical transmission system, comprising:
   an optical nonlinear element having nonlinear input/output characteristics and reproducing an optical signal;
   a power detector photoelectrically converting an optical signal reproduced by said optical nonlinear element into an electrical signal, and detecting a power of a specific frequency component obtained from the electrical signal by the photoelectric conversion; and
   a variable output device amplifying or attenuating the optical signal inputted to said optical nonlinear element in response to a detection result by said power detector;
   wherein said power detector comprises:
   a photo detector converting the optical signal reproduced by said optical nonlinear element to the electrical signal;
   a filter retrieving the specific frequency component from the electrical signal obtained by said photo detector; and
   a power measuring device measuring the power of the specific frequency component retrieved by said filter;
   wherein said power detector detects power of a bit rate frequency component of the inputted optical signal; and
   the optical transmission system further comprising:
   a control circuit controlling said variable output device such that the power of the bit rate frequency component becomes minimum, based on a detection result by said power measuring device; and
   wherein said control circuit makes a gain of said variable output device increase/decrease periodically in a minute range to perform gain control of said variable output device in response to variation of the power of the bit rate frequency component associated with the minute variety of the gain.

2. The optical transmission system according to claim 1, wherein the specific frequency is the bit rate frequency.

3. The optical transmission system according to claim 1, wherein said control circuit
   makes the gain of said variable output device increase when the power of the bit rate frequency component is decreasing with gain increase of the variable output device, in association with the minute variation of the gain, and
   makes the gain of said variable output device decrease when the power of the bit rate frequency component is increasing with gain increase of the variable output device in association with the minute variation of the gain.

4. The optical transmission system according to claim 1, wherein the inputted optical signal is an optical signal modulated in an NRZ (Non Return to Zero) format.

5. The optical transmission system according to claim 1, wherein said power detector detects a power of a bit rate frequency component and a power of a direct-current component of the inputted optical signal.

6. The optical transmission system according to claim 5, wherein said power detector comprises:
   a low pass filter retrieving the direct-current component from the electrical signal obtained by said photo detector; and
   a power monitor respectively measuring the power of the bit rate frequency component and the power of the direct-current component retrieved by said band pass filter and said low pass filter.

7. The optical transmission system according to claim 5, wherein the control circuit controls said variable output device such that a rate of the power of the bit rate frequency component and the power of the direct-current component maintains a constant value, based on a detection result by said power detector.

8. The optical transmission system according to claim 5, wherein the inputted optical signal is an optical signal modulated in an RZ (Return to Zero) format.

9. The optical transmission system according to claim 1, wherein the filter is a band-pass filter.

* * * * *

UNITED STATES PATENT AND TRADEMARK OFFICE
CERTIFICATE OF CORRECTION

PATENT NO. : 7,443,574 B2  Page 1 of 1
APPLICATION NO. : 11/542227
DATED : October 28, 2008
INVENTOR(S) : Tomoyuki Akiyama It is certified that error appears in the above-identified patent and that said Letters Patent is hereby corrected as shown below:

On the Title page:

Item "(73)" Assignee: "FIJITSU LIMITED, Kawasaki, Japan"

Should read:

Item "(73)" Assignee: --FUJITSU LIMITED, Kawasaki, Japan--

Signed and Sealed this

Twenty-fifth Day of August, 2009

David J. Kappos
*Director of the United States Patent and Trademark Office*